Sept. 20, 1960  R. S. CONDON  2,953,042
INDEXING MECHANISM
Filed Feb. 20, 1958  2 Sheets-Sheet 1
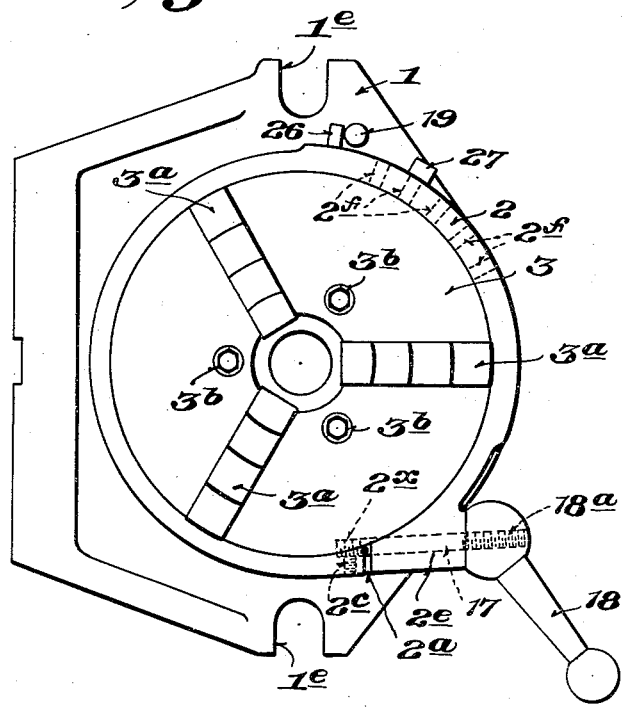
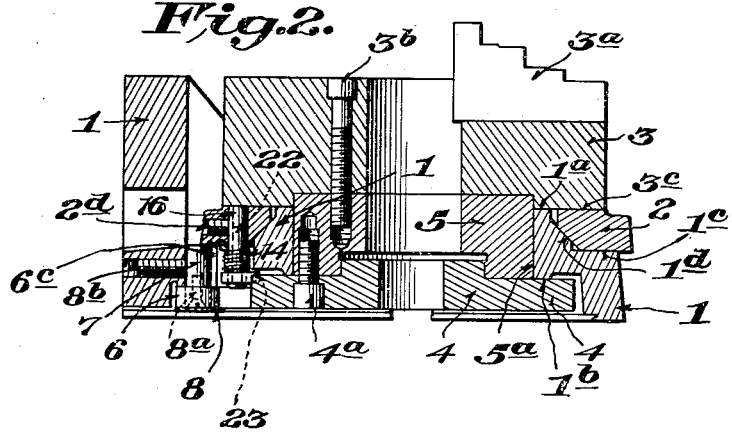
Robert S. Condon INVENTOR.
BY Alexander Mowell
ATTORNEYS

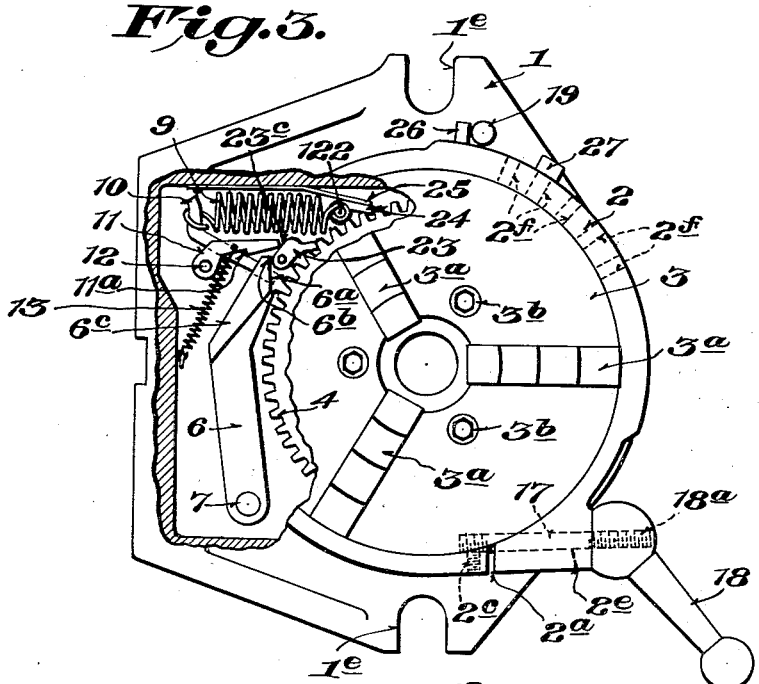
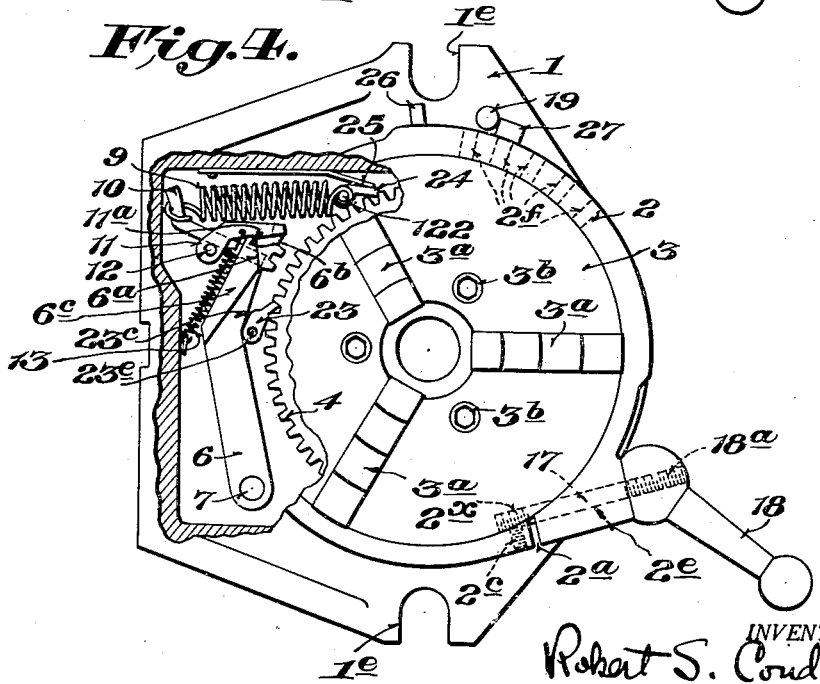

United States Patent Office 2,953,042
Patented Sept. 20, 1960

2,953,042
INDEXING MECHANISM
Robert S. Condon, 112 Cindy Lane, Berlin, Conn.
Filed Feb. 20, 1958, Ser. No. 716,398
11 Claims. (Cl. 74—815)

This invention relates to mechanical indexing mechanisms and the principal object thereof is to provide a quick and easy means for selecting the number of indexes desired within the range of a master index plate, by merely setting a stop on the clamping ring.

A further object of this invention is to facilitate the unclamping, the indexing, and the re-clamping by making these operations each performed by operation of the same hand lever, which lever is turned to release the clamp, and then moved laterally to the limit of a set-stop to select the amount to be indexed, is then moved back to index, and is finally turned to reclamp the rotating parts that complete the index.

Heretofore indexes have been used which employ a master index plate, but with such units it has been necessary to select the number of indexes by placing a masking plate over the index plate to limit the number of notches in the index plate into which the locking pawl might drop. The use of masking plates is objectionable in that a number of different masking plates must be provided, and these must necessarily be stored and protected from damage; also the correct masking plate must in most cases be installed by the operator before he starts to set up a job, and operators sometimes forget to do this; also the operator must open up the bottom of the unit to place a masking plate into position, thus exposing the index plate and linkages to dirt. Moreover, such indexes heretofore provided have separate levers for releasing the locking pawl and for effecting the clamping, and are so constructed as to require the operator to take hold of the chuck itself to move the index to a new position.

The invention will be better understood from the detailed description which follows when considered in conjunction with the appended drawings, wherein I have shown several embodiments of my invention and wherein:

Figure 1 is a plan view of the complete indexing unit.

Fig. 2 is an approximate diametrical transverse section through the indexing unit.

Fig. 3 is a plan view, similar to Fig. 1, but with the portion above the indexing linkage broken away, to show the index pawl in locking position.

Fig. 4 is a plan view similar to Fig. 3 except that the index pawl is shown withdrawn, and the index driving ratchet is shown positioned to move the index plate to a new index position.

In Figure 1, the conventional chuck 3 has three clamping jaws 3a which are radially moved to hold the work piece (not shown) by the usual means conventional in such chucks. The chuck 3 or other work-holding device, is mounted on a base 1, which latter is mounted on a machine table preferably by bolts passing through slots 1e to hold the base securely on the table.

My indexing unit functions to rotate the chuck 3 through the amount of indexing usually after successive operations, such as milling, drilling, or the like, successively performed on the work piece. Considerable time is saved in the indexing operation because of the fact that the same hand lever 18 may be rotated to release the clamping (later described), and then this hand lever 18 used to move the clamping ring 2 to the right until stop screw 27 engages a stop pin 19 to select the amount to be indexed, and then by further use of hand lever 18 the clamping ring 2 is moved to the left until limit pin 26 engages a stop pin 19 to complete the indexing of chuck 3; and the hand lever 18 may then be rotated to reclamp the chuck 3 in newly indexed position.

Fig. 2 shows a cross section through the approximate center of my indexing unit, and reveals the structure of the unit. It will be seen in this figure that chuck 3 is mounted on base 1. Chuck 3 is attached to spacer 5 by screws 3b. An index plate 4 is mounted on spacer 5 by means of screws 4a. The chuck 3 rides between surfaces 1a and 1b of base 1 to securely hold the chuck in position on said base. Spacer 5 is rotatably journaled as at 5a within base 1 to further position chuck 3 on base 1. When chuck 3 is indexed it thus can be rotated in its mounting on base 1 freely, but with a minimum of clearance between the bearing surfaces 1a, 1b and 5a.

Clamping ring 2 (see Fig. 2) is machined to fit freely into the space between surface 3c of chuck 3 and surface 1c of base 1, and same engages angular surface 1d of base 1. Clamping ring 2 is split at 2a (Figs. 1, 3 and 4) to permit the clamping action. A stud 17 is threaded into clamping ring 2 at 2x and locked against rotation by set screw 2c. This stud 17 freely fits throughout the rest of its length through a bore 2e at the opposite side of the split 2a in clamping ring 2, and its outer end is threaded as at 18a into the hub of hand lever 18. Thus, when hand lever 18 is rotated in one direction the split 2a is reduced making the ring 2 smaller in diameter and forcing the ring 2 up along the angular surface 1d of base 1 to clamp the chuck 3 by lifting same upwardly and thus binding index plate 4 against surface 1b of base 1.

Further reference will be had to Fig. 2 in explanation of the index linkages. As shown in Figs. 3 and 4, the index plate 4 is notched around its periphery with any number of notches to suit the number of indexes required. The indexing plate 4 shown has 60 notches therein, and thus permits indexes 4, 5, 6, 10, 12, 15, 20 and 30. An index of 180 degrees can be affected by setting for four indexes and then indexing twice with handle 18. In like manner, three index positions can be obtained by setting for six indexes and indexing twice.

The index linkage shown in Fig. 3 will now be described. An index pawl 6 is journaled on pivot 7 (Fig. 2) held into its hole in base 1 by set screw 8b. Pawl 6 is held onto pawl pivot 7 by a thin washer 8, and the washer 8 is in turn held onto pivot pin 7 by means of screw 8a. The index pawl is forced by pawl spring 9 (Fig. 3) into engagement with the index plate 4, one end of spring 9 being anchored on stop ratchet pin 122 and the other end being hooked on pawl spring link 10. This link 10 is mounted on index pawl 6 having its inner end seated in the bottom of a blind hole in index pawl 6, as shown. This link 10 does not at any time touch the thin latch 11 or its pivot 12. Latch spring 13 is shown urging latch 11 toward index pawl 6. Stop ratchet 24 permits index plate 4 to rotate clockwise only, the ratchet 24 being mounted on ratchet pin 122 which in turn is fixed in base 1. Stop ratchet spring 25 is a flat spring mounted on the wall of the recess in base 1 as shown, and urges the stop ratchet 24 into engagement with the index plate 4 at all times.

The drive ratchet 23 shown in Figs. 3 and 4, is carried by clamping ring 2. Thus, this drive ratchet 23 is moved about the center of rotation of the index plate 4 when the clamping ring 2 is moved by the handle 18 as shown in Figs. 1, 3 and 4. It will be apparent from Fig. 2 that drive ratchet 23 is supported by headed pin 22 which latter is freely journaled in ratchet 23, pin 22 being held securely in supporting sleeve 16 (Fig. 2) since pin 22 has a tight press fit into sleeve 16. Ratchet spring 14 around the lower end of sleeve 16 has its upper end anchored into the underside of ring 2, and its lower end anchored securely to drive ratchet 23 so as to exert a torsional force to urge drive ratchet 23 toward index plate 4 at all times. This drive ratchet 23, with its spring 14, supporting sleeve 16, and pin 22 are securely held in the hole for sleeve 16 in clamping ring 2 by the set screw 2d. It will be noted that drive ratchet 23 and its pin 22 as shown in Fig. 2 are above the main portion of locking pawl 6. Drive ratchet 23 is, however, adapted to engage a projecting cam face 6c on the upper side of pawl 6. This engagement is explained in connection with Figs. 3 and 4.

The operation of this index mechanism can best be followed with reference to Figs. 3 and 4.

To set the amount of index, place stop screw 27 in one of the several holes provided therefor in the outer face 2f of the clamping ring 2. These holes (Figs. 3 and 4) are positioned correctly for all equal index divisions available for the particular index plate 4 used.

To unclamp the index, unscrew the handle 18 to allow the split clamping ring 2 to expand so that it no longer rides up surface 1d thereby releasing plate 4 from binding relation against surface 1b of base 1.

To select the amount to be indexed, shift handle 18 in an anti-clockwise direction until stop screw 27 hits stop pin 19. The corresponding rotation of ring 2 will carry drive ratchet 23 therewith to a position such as shown in Fig. 4. It will be observed that as drive ratchet 23 so moves its leading end 23e (see Fig. 4) will engage cam surface 6a and shift locking pawl 6 out of engagement with index plate 4. When pawl 6 is so shifted, it is caught in this disengaged position by the thin latch 11 by hook 11a catching on end of cam 6a at 6b. The locking pawl 6 is thus held out of engagement. This pawl 6 is shown withdrawn further than necessary and drive ratchet is moved further than actually necessary to clarify the drawing. Ends 23e and 23c of drive ratchet 23 are both approximately the same distance from the center of rotation of index plate 4, and both surfaces must lift pawl 6 so that it will be caught by hook 11a which engages the outer end 6b of the cam 6a. To make sure pawl 6 is caught, the pawl 6 may be lifted a little more than is necessary.

To complete the index, move handle 18 in a clockwise direction until limit pin 26 re-engages stop pin 19. The corresponding rotation of ring 2 will carry drive ratchet 23 back to its position shown in Fig. 3. While ratchet 23 is going back, it will carry index plate 4 with it to complete the index. While drive ratchet 23 is moving back to its position shown in Fig. 3, its forward edge 23c will re-engage cam 6a the amount that this driving ratchet overlifts pawl 6 to make sure that latch 11 hooks onto 6b on surface 6a. As this edge 23c is forward of the center of ratchet 23, this engagement will not tend to rotate drive ratchet 23 out of engagement with index plate 4. This leading edge 23c of ratchet 23 will also engage the end of latch 11 and release its engagement with pawl 6, and thus allow pawl 6 to re-engage index plate 4.

To re-clamp, rotate handle 18 to tighten and thus contract split clamping ring 2 and force it up along surface 1d to lift the chuck 3 and bind index plate 4 against surface 1b of base 1.

I do not limit my invention to the exact form shown in the drawing, for obviously changes may be made therein within the scope of the claims.

I claim:

1. An indexing mechanism comprising a base; a rotatable index plate journaled on the base and having a work holding chuck secured thereto, said plate having peripheral notches; a clamping ring rotatably mounted on the said base; means for actuating the clamping ring to clamp the plate to the base; a fixed stop and an adjustable index selecting stop on said ring cooperating with a limiting projection on the base; a pawl pivoted on the base having teeth adapted to engage the notches of the plate and having a cam surface; means yieldably urging the pawl towards the plate; a spring actuated latch adapted to engage the pawl when swung away from the plate; means preventing rotation of the plate in one direction; and a drive ratchet on the clamping ring engaging the notches of the plate and adapted to engage the cam surface of the pawl whereby when the clamping ring is rotated to select the index in a direction opposite to that which the indexing plate may rotate the drive ratchet will engage the cam and swing the pawl away from the plate and into engagement with the latch, and when the clamping ring is rotated to complete the index in the direction which the index plate may rotate, the drive ratchet will move the plate therewith, and will shift the latch at the end of such rotary movement to release the pawl from said latch.

2. In a device as set forth in claim 1, said base having a bore; a spacer rotatable in the bore; said chuck being mounted on the spacer and engaging the upper face of the base; and said index plate being mounted on the spacer and engaging the lower face of the base.

3. An indexing mechanism comprising a base; a rotatable index plate journaled on the base and having a work holding chuck secured thereto, said plate having peripheral notches; a clamping ring rotatably mounted on the said base and adapted in one position to clamp the plate to the base; a fixed stop and an adjustable index selecting stop on said ring cooperating with a limiting projection on the base; a pawl pivoted on the base having teeth adapted to engage the notches of the plate and having a cam surface; means yieldably urging the pawl towards the plate; a spring actuated latch adapted to engage the pawl when swung away from the plate; means preventing rotation of the plate in one direction; and a drive ratchet on the clamping ring engaging the notches of the plate and adapted to engage the cam surface of the pawl whereby when the clamping ring is rotated to select the index in a direction opposite to that which the indexing plate may rotate, the drive ratchet will engage the cam and swing the pawl away from the plate and into engagement with the latch, and when the clamping ring is rotated to complete the index in the direction which the index plate may rotate, the drive ratchet will move the plate therewith, and will shift the latch at the end of such rotary movement to release the pawl from said latch; said base having a bore; a spacer rotatable in the bore; said chuck being mounted on the spacer and engaging the upper face of the base; and said index plate being mounted on the spacer and engaging the lower face of the base; said base having a conical exterior wall below the chuck; and said clamping ring having a complementary conical bore engaging the conical wall of the base; said ring being adapted to peripherally contact the underside of the check, whereby as the ring is contracted the ring will be shifted axially of the base to frictionally bind the index plate against the lower face of the base.

4. An indexing mechanism comprising a base; a rotatable index plate journaled on the base and having a work holding chuck secured thereto, said plate having peripheral notches; a clamping ring rotatably mounted on the said base and adapted in one position to clamp the plate to the base; a fixed stop and an adjustable index selecting stop on said ring cooperating with a limiting projection on the base; a pawl pivoted on the base having teeth adapted to engage the notches of the plate and having a cam surface; means yieldably urging the pawl towards the plate; a spring actuated latch adapted to engage the pawl when swung away from the plate; means preventing rotation of the plate in one direction; and a drive ratchet on the clamping ring engaging the notches of the plate and adapted to engage the cam surface of the pawl whereby when the clamping ring is rotated to select the index in a direction opposite to that which the indexing plate may rotate, the drive ratchet will engage the cam and swing the pawl away from the plate and into engagement with the latch, and when the clamping ring is rotated to complete the index in the direction which the index plate may rotate, the drive ratchet will move the plate therewith, and will shift the latch at the end of such rotary movement to release the pawl from said latch; said clamping ring being split; and contracting means therefor comprising a rod anchored at one end in the ring and extending across the split loosely through a bore at the other side of the slpit, said rod having a threaded end beyond the bore; and a handle threaded on said threaded end, whereby rotation of the handle in one direction will unclamp the indexing mechanism, and while so unclamped swinging movement of handle in an anti-clockwise direction will select the amount to be indexed, and swinging movement in the opposite direction will complete the index, and rotation of the handle in the opposite direction will clamp the newly indexed parts in position.

5. In a device as set forth in claim 1; said clamping ring having a bore adjacent the notches of the index plate; a sleeve in said bore; means for locking the sleeve in said bore; a headed pin mounted in said sleeve; said drive ratchet being freely journaled on the pin; and a coiled spring around the sleeve having one end anchored to the ring and the other end anchored to the ratchet.

6. A work locating device, comprising a base; an indexing mechanism journaled on the base and carrying a work holding chuck; said indexing mechanism including a rotatable index plate having a plurality of peripheral notches; a contractible clamping ring rotatably mounted on the said base; a fixed stop and an adjustable index selecting stop on said ring cooperating with a limiting projection on the base; means for contracting the ring to clamp the indexing mechanism to the base to prevent rotation; a pawl pivoted on the base having teeth engaging the notches of the index plate and having a cam surface adjacent its toothed end; means yieldably urging the pawl into engagement with the index plate; a spring actuated latch adapted to engage the toothed end of the pawl when the latter is swung away from the index plate; means preventing rotation of the index plate in one direction; and a drive ratchet pivotally mounted on the clamping ring and yieldably engaging the notches of the index plate and adapted to engage the cam surface of the pawl, whereby when the clamping ring is rotated to select the index in a direction opposite to that which the indexing plate may rotate, the drive ratchet will engage the cam and swing the pawl away from the index plate and into engagement with the latch, and when the clamping ring is rotated to complete the index in the direction which the index plate may rotate, the drive ratchet will move the plate therewith, and will shift the latch at the end of such rotary movement to release the pawl from said latch.

7. In a device as set forth in claim 6, said base having a bore; a spacer rotatable in the bore; said chuck being mounted on the spacer and engaging the upper face of the base; and said index plate being mounted on the spacer and engaging the lower face of the base; said base having a conical exterior wall below the chuck; and said clamping ring having a complementary conical bore engaging the conical wall of the base; said ring being adapted to peripherally contact the underside of the chuck, whereby as the ring is contracted the ring will be shifted axially of the base to frictionally bind the index plate against the lower face of the base.

8. A work locating device, comprising a base; an indexing mechanism journaled on the base and carrying a work holding chuck; said indexing mechanism including a rotatable index plate having a plurality of peripheral notches; a clamping ring rotatably mounted on the said base; a fixed stop and an adjustable index selecting stop on said ring cooperating with a limiting projection on the base; means for contracting the ring to clamp the indexing mechanism against rotation; a pawl pivoted on the base having teeth engaging the notches of the index plate and having a cam surface adjacent its toothed end; means yieldably urging the pawl into engagement with the index plate; a spring actuated latch adapted to engage the toothed end of the pawl when the latter is swung away from the index plate; means preventing rotation of the index plate in one direction; and a drive ratchet pivotally mounted on the clamping ring and yieldably engaging the notches of the index plate and adapted to engage the cam surface of the pawl, whereby when the clamping ring is rotated to select the index in a direction opposite to that which the indexing plate may rotate, the drive ratchet will engage the cam and swing the pawl away from the index plate and into engagement with the latch, and when the clamping ring is rotated to complete the index in the direction which the index plate may rotate, the index, the drive ratchet will move the plate therewith, and will shift the latch at the end of such rotary movement to release the pawl from said latch; said clamping ring being split; and said contracting means comprising a rod anchored at one end in the ring and crossing the split, said rod extending loosely through a bore at the other side of the split and having a threaded end projecting beyond the bore; and a handle threaded on said threaded end, whereby rotation of the handle in one direction will unclamp the indexing mechanism, and while unclamped swinging movement of handle in an anti-clockwise direction will select the amount to be indexed, and swinging movement thereof in the opposite direction will complete the index, and rotation of the handle in the opposite direction will clamp the newly indexed parts in position.

9. An indexing mechanism comprising a base; a rotatable index plate journaled on the base and carrying a work holding chuck; said index plate having peripheral notches, a contractible clamping ring rotatably mounted on the said base; means for contracting the ring to clamp the plate to the base to prevent rotation; a pawl pivoted on the base adapted to engage the notches of the plate and having a cam surface; means yieldably urging the pawl towards the plate; a spring actuated latch adapted to engage the pawl when swung away from the plate; means preventing rotation of the plate in one direction; and a drive ratchet on the clamping ring and engaging the notches of the plate and adapted to engage the cam surface of the pawl, whereby when the clamping ring is rotated to select the index in a direction opposite to that which the indexing plate may rotate, the drive ratchet will engage the cam and swing the pawl away from the index plate and into engagement with the spring actuated latch, and when the clamping ring is rotated to complete the index in the direction which the index plate may rotate, the drive ratchet will move the plate therewith and will shift the spring latch at the end of such rotary movement to release the pawl from said latch.

10. An indexing mechanism comprising a base; a rotatable index plate journaled on the base and carrying a work holding chuck; said index plate having peripheral notches; a clamping ring rotatably mounted on the said base; means for contracting the ring to clamp the plate against rotation; a pawl pivoted on the base adapted to engage the notches of the plate and having a cam surface; means yieldably urging the pawl towards the plate; a spring actuated latch adapted to engage the pawl when swung away from the plate; means preventing rotation of the plate in one direction; and a drive ratchet on the clamping ring and engaging the notches of the plate and adapted to engage the cam surface of the pawl, whereby when the clamping ring is rotated to select the index in a direction opposite to that which the indexing plate may rotate, the drive ratchet will engage the cam and swing the pawl away from the index plate and into engagement with the spring actuated latch, and when the clamping ring is rotated to complete the index in the direction which the index plate may rotate, the drive ratchet will move the plate therewith and will shift the spring latch at the end of such rotary movement to release the pawl from said latch; said clamping ring being split; and said contracting means comprising a rod anchored at one end in the ring and crossing the split, said rod extending loosely through a bore at the other side of the split and having a threaded end projecting beyond the bore; and a handle threaded on said threaded end, whereby rotation of the handle in one direction will unclamp the indexing mechanism, and while unclamped swinging movement of handle in an anti-clockwise direction will select the amount to be indexed, and swinging movement thereof in the opposite direction will complete the index, and rotation of the handle in the opposite direction will clamp the newly indexed parts in position.

11. In a work locating device; a rotatable index plate journaled on the base and carrying a work holding chuck; said plate having notches; a contractible clamping ring rotatably mounted on the said base; a fixed stop and an adjustable index selecting stop on said ring cooperating with a limiting projection on the base; means for contracting the ring to clamp the plate to the base to prevent rotation; a pivoted pawl engaging the notches of the plate and having a cam surface; means yieldably urging the pawl towards the plate; a latch adapted to engage the pawl when the latter is swung away from the plate; means preventing rotation of the plate in one direction; and a drive ratchet on the clamping ring engaging the notches of the plate and adapted to engage the cam surface of the pawl, whereby when the clamping ring is rotated to select the index in a direction opposite to that which the plate may rotate, the drive ratchet will engage the cam and swing the pawl away from the plate and into engagement with the latch, and when the ring is rotated to complete the index in the direction which the plate may rotate, the ratchet will move the plate therewith and will shift the latch at the end of such rotary movement to release the pawl from said latch.

References Cited in the file of this patent
UNITED STATES PATENTS

| | | |
|---|---|---|
| 1,151,004 | Fay | Aug. 24, 1915 |
| 1,469,051 | Poitras | Sept. 25, 1923 |
| 2,447,808 | Marsilius | Aug. 24, 1948 |
| 2,848,909 | Hill | Aug. 26, 1958 |